(12) United States Patent
Burger-Scheidlin et al.

(10) Patent No.: US 10,474,138 B2
(45) Date of Patent: Nov. 12, 2019

(54) SIMPLIFIED FIELD DEVICE EXCHANGE IN A PROCESSING DEVICE

(71) Applicant: Robert Bosch GmbH, Stuttgart (DE)

(72) Inventors: Christoph Burger-Scheidlin, Weissenfeld (DE); Daniel Barisic, Haar (DE); Tobias Gruber, Munich (DE); Anton Pfefferseder, Sauerlach (DE); Husain Aljazzar, Tuebingen (DE); Dirk Stegemann, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 15/039,078

(22) PCT Filed: Oct. 2, 2014

(86) PCT No.: PCT/EP2014/071140
§ 371 (c)(1),
(2) Date: May 25, 2016

(87) PCT Pub. No.: WO2015/074795
PCT Pub. Date: May 28, 2015

(65) Prior Publication Data
US 2016/0357178 A1    Dec. 8, 2016

(30) Foreign Application Priority Data
Nov. 25, 2013 (DE) .......... 10 2013 223 978

(51) Int. Cl.
*G05B 19/00* (2006.01)
*G05B 19/418* (2006.01)
(Continued)

(52) U.S. Cl.
CPC ..... *G05B 19/4185* (2013.01); *G05B 19/0426* (2013.01); *H04W 4/80* (2018.02);
(Continued)

(58) Field of Classification Search
None
See application file for complete search history.

(56) References Cited

U.S. PATENT DOCUMENTS

| 2002/0180598 | A1  | 12/2002 | Pfefferseder et al. |
| 2004/0259533 | A1* | 12/2004 | Nixon ........... H04W 76/14 455/414.1 |

(Continued)

FOREIGN PATENT DOCUMENTS

| DE | 10127057 | 12/2002 |
| DE | 102007014369 | 10/2008 |

(Continued)

OTHER PUBLICATIONS

International Search Report for Application No. PCT/EP2014/071140 dated Dec. 15, 2015 (English Translation, 3 pages).

*Primary Examiner* — James G Norman
(74) *Attorney, Agent, or Firm* — Michael Best & Friedrich LLP (57) ABSTRACT

The invention relates to a method for operating a processing device (2) that comprises a control unit (4) and at least one field device (8, 10, 12) connected to said control unit (4) for the purpose of exchanging data via a data exchange connection (6), in which a field device (10) to be exchanged is replaced by another field device (12) to be inserted, and which comprises the steps of: generating an exchange signal (AS) using an exchange signal generator (14), and transmitting said exchange signal (AS) to the control unit (4). The invention also relates to a corresponding processing device and a control unit, field device, and exchange signal generator, as well as a computer program.

15 Claims, 3 Drawing Sheets

(51) Int. Cl.
    *G05B 19/042*    (2006.01)
    *H04W 4/80*    (2018.01)
(52) U.S. Cl.
    CPC .............. *G05B 2219/23406* (2013.01); *G05B 2219/25061* (2013.01); *G05B 2219/25074* (2013.01); *G05B 2219/25101* (2013.01); *G05B 2219/31121* (2013.01); *G05B 2219/31197* (2013.01); *G05B 2219/31259* (2013.01); *Y02P 90/18* (2015.11)

(56) References Cited

U.S. PATENT DOCUMENTS

2005/0248454 A1* 11/2005 Hanson ................ G06Q 10/087
                                                        340/539.26
2007/0250180 A1   10/2007 Bump et al.
2014/0364963 A1* 12/2014 Lovell .............. G06K 19/07758
                                                              700/2
2015/0113180 A1*  4/2015 Baret .................... G05B 19/042
                                                              710/36

FOREIGN PATENT DOCUMENTS

| DE | 102007014369 A1 * | 10/2008 | ......... H05B 37/0254 |
|----|-------------------|---------|------------------------|
| DE | 102007026678      | 12/2008 | |
| DE | 102011051212      | 12/2011 | |
| DE | 102011089346      | 6/2013  | |
| DE | 102012202594      | 8/2013  | |

* cited by examiner

SIMPLIFIED FIELD DEVICE EXCHANGE IN A PROCESSING DEVICE

BACKGROUND OF THE INVENTION

The present invention relates to a method for operating a processing device, to a processing device and to a control unit, a field device and an exchange signal generator for such a processing device and to a computer program.

As a rule, processing devices such as, e.g. fire or burglary alarm systems consist of one or also a number of, often decentralized control units and a number of distributed field devices such as, e.g. sensors and/or actuators. For a multiplicity of reasons, it may be necessary to exchange one of the field devices, e.g. because one field device is defective.

From DE 101 27 057 A1, an alarm signaling sender is known which is constructed of modules, the modules being connected via a bus. In this arrangement, the modules can be inserted and/or removed during the operation of the alarm signaling sender. According to DE 101 27 057 A1, it is provided that during the removal of a module during the operation, for example, monitoring circuits ensure that no overvoltages would occur. If, in contrast, a module is inserted, it is provided, according to DE 101 27 057 A1 that the module registers with the alarm sender.

The physical removal of a field device, as a rule, leads to the processing device containing the field device generating and displaying a fault message. Due to the electrical cabling of the control units and of the field devices, it may also occur that the removal of an individual field device separates several other field devices from their electrical power supply. This may be the case, e.g. with field-bus cabling.

Before exchanging a field device, it is known to switch the processing device or at least individual components (e.g. an individual field bus) off completely or to put them into a separate maintenance mode in which no fault message is generated and displayed in the case of a missing field device. The consequence is that the components switched off such as, e.g. individual field devices of the processing device, no longer fulfill their original function.

If a defective field device has been replaced by a new operable field device, the new field device must be connected to the processing device and subsequently configured. This is done manually or automatically when, e.g., a field device of identical construction is inserted and all field devices are configured by the control unit when they are taken into operation and no initial commissioning of the field devices is required.

There is, therefore, a requirement for reducing the amount of effort in the case of an exchange of a field device of a processing device.

SUMMARY OF THE INVENTION

Against this background, the present invention proposes a method for operating a processing device, a processing device and a control unit, a field device and an exchange signal generator for such a processing device and a computer program.

An essential aspect of the present invention consists in that an exchange signal is generated by means of an exchange signal generator and the exchange signal is transmitted to the control unit when a field device to be exchanged is replaced by another field device to be inserted.

By this means, the processing device can detect an impending exchange of a field device. The processing device can thereupon automatically separate the field device to be exchanged from, e.g., a field bus which connects the control unit and the field devices in a data and/or signal transmitting manner. Thus, the processing device can be deactivated only partially in that only the affected components of the processing device are stopped whilst the other components of the processing device remain active. This allows field devices such as, e.g., actuators and/or sensors to be exchanged in active operation of a processing device without the entire processing device having to be deactivated for this purpose. In addition, it is not required to place the entire processing device into a state in which it cannot fulfill its actual task. Thus, the amount of effort is reduced in the case of an exchange of a field device.

According to one embodiment, an exchange feature of the field device to be exchanged is detected and, following the detection of the exchange feature, the exchange signal is generated. The result is that an identification of the field device to be exchanged is achieved by means of the exchange feature allocated to the field device in a particularly simple manner.

According to a further embodiment, the field device to be exchanged has a sensor by means of which the exchange signal is detected. The result is that by means of the sensor, an approach or contact of the exchange signal generator with the field device to be exchanged can be detected in a simple manner. Evaluating the exchange signal allows for a simple identification of the field device to be exchanged. E.g., it can be provided that the field device and the exchange device communicate with one another bidirectionally, e.g. in accordance with Near Field Communication (NFC), and, following the completed communication, an exchange signal is generated which is then detected by means of the sensor.

According to a further embodiment, the exchange signal is transmitted from the exchange signal generator to the field device to be exchanged, and transmitted to the control unit from the field device to be exchanged. The result is that no additional data links are necessary for transmitting the exchange signal, but pre-existing data links which connect the field device to be exchanged in a data-transmitting manner to the control unit, can be used for transmitting the exchange signal to the control unit. Here, too, it can be provided that the field device and exchange device communicate with one another bidirectionally, e.g. in accordance with Near Field Communication (NFC) and, following the completed communication, an exchange signal is generated and transmitted.

According to a further embodiment, following the presence of the exchange signal, an identification record of the field device to be exchanged is transmitted to the control unit. The result is that the control unit is provided with information about the field device to be exchanged in order to ensure a reliable exchange of the field device to be exchanged.

According to a further embodiment, following the presence of at least the exchange signal, a feedback signal is generated. The result is that a return message on the steps already concluded successfully is present and it is thus ensured that the method can be continued without impairing the function of the processing device. For this purpose, the feedback signal can be forwarded, e.g. from the control unit to the field device to be exchanged. It can also be provided to generate the feedback signal only if, apart from the exchange signal, it has been detected that the identification record of the field device to be exchanged has been transmitted to the control unit.

According to a further embodiment, a configuration record is read out of a memory of the field device to be exchanged and temporarily stored in a memory of the control unit or in a memory of the exchange signal generator. The result is that the configuration data of the field device to be exchanged can be used for configuring the new field device to be inserted.

According to a further embodiment, following the presence of the identification record, the data exchange link is split open by at least one separating element. The data exchange link can be constructed additionally for supplying the field devices with electrical energy. The result is that the field device to be exchanged can be separated from the processing device without negative influence on the processing device. If the data exchange link is constructed additionally for supplying the field devices with electrical energy, the field device is also separated from its power supply.

According to a further embodiment, a preparation termination signal is generated when the processing device is prepared for replacing the field device to be exchanged with the field device to be inserted. This is the case, e.g., when the exchange signal is present and/or the identification record of the field device to be exchanged has been transmitted to the control unit and/or the feedback signal is present and/or the configuration record of the field device to be exchanged is temporarily stored in the memory of the control unit or of the exchange signal generator. The result is that a return message on the steps already concluded successfully is present and it is thus ensured that the method can be continued without impairing the function of the processing device, namely the actual exchange of the field devices.

According to a further embodiment, an exchange of the field device to be exchanged is detected by the other field device to be inserted and, thereupon, a message is generated and, following the message, the data exchange link split open is again connected in a data transmitting manner. The result is that a message on the steps already concluded successfully is present and it is thus ensured that the method can be continued without impairing the function of the processing device since, due to the message, it is ensured that an exchange of the field devices has taken place. In this context, an exchange of field devices can be detected, e.g. due to the fact that the control unit checks at intervals which field devices are connected to the control unit, e.g. by sending out corresponding test signals on a bus which answers to or is sent back by the field devices connected.

Further aspects relate to a processing device with a control unit and at least one field device connected to the control unit for data exchange by means of a data exchange link, the field device, in interaction with an exchange signal generator, being designed for generating an exchange signal by means of the exchange signal generator and transmitting the exchange signal to the control unit, and a control unit, a field device and an exchange signal generator for such a processing device. In particular, the processing device is a fire and/or burglary alarm system. Preferably, one or also a number of decentralized control units are used. The field devices are designed, in particular, as sensors and/or actuators.

An implementation of the method in the form of a computer program is also advantageous since this produces particularly low costs, particularly if the processing device to be executed is also used for other tasks and is therefore present, in any case. Suitable data carriers for providing the computer program are, in particular, floppy disks, hard disks, flash memories, EEPROMs, CD-ROMs, DVDs and others. Downloading a program via computer networks (Internet, Intranet etc.) is also possible. In this context, the computer program can have components which are designed for operating the control unit, the field devices and the exchange signal generator according to the method.

Other advantages and embodiments of the invention are obtained from the description and the attached drawing.

Naturally, the features mentioned above and still to be explained in the text which follows can be used not only in the combination specified in each case but also in other combinations or by themselves without departing from the framework of the present invention.

BRIEF DESCRIPTION OF THE DRAWINGS

The invention is represented diagrammatically in the drawing by means of an exemplary embodiment and will be described in detail in the text which follows, referring to the drawing.

DETAILED DESCRIPTION

In the figures, identical or mutually corresponding elements are specified with identical reference symbols. A repeated explanation is omitted.

Figure 1:
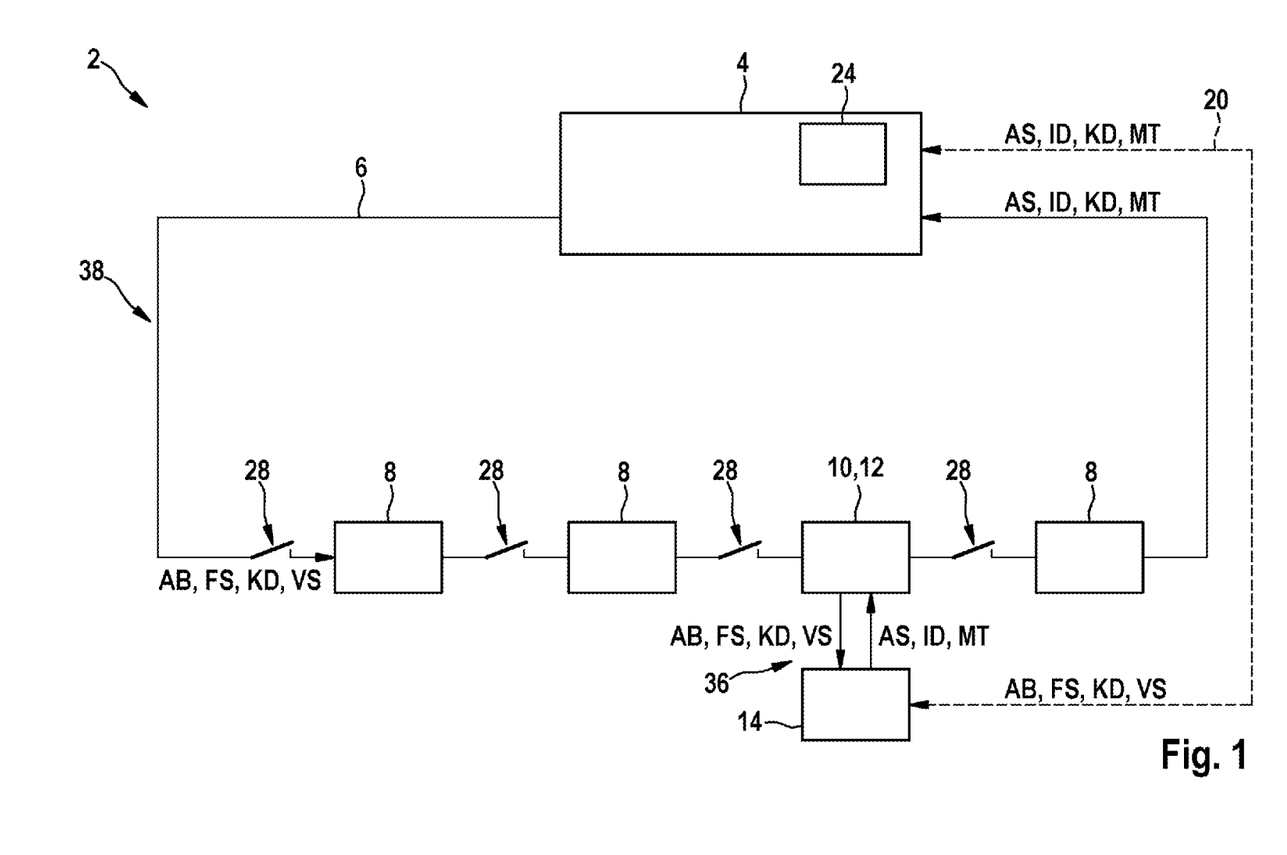
FIG. 1 shows a processing device in a diagrammatic representation.

In FIG. 1, a processing device 2 with a control unit 4 and a plurality of field devices 8, 10, 12 and an exchange signal generator 14 interacting with the processing device 2 are represented diagrammatically.

In the present exemplary embodiment, the processing device 2 is designed as fire alarm system, the field devices 8, 10, 12 being designed as carbon monoxide sensors in accordance with the present exemplary embodiment.

The control unit 4 and the field devices 8, 10, 12 are connected to one another annularly by a field bus 38 for data exchange. According to the present exemplary embodiment, a data exchange link 6 is provided here which connects the control unit 4 and the field devices 8, 10, 12 to one another in a data-transmitting manner. In the present exemplary embodiment, the data exchange link 6 is designed to be wire-connected. However, the data exchange link 6 can also be designed wirelessly or connected by optical waveguide. Thus, the data exchange link 6 provides for a transmission of data and signals as will be explained later.

The data exchange link 6 has been allocated separating elements 28 by means of which the data exchange link 6 can be split open so that a data exchange via the data exchange link 6 can be interrupted. The data exchange link 6 can be designed additionally to supply the field devices 8, 10, 12 with electrical energy. The separating elements 28 are connected via control lines (not shown) to the control unit 4 in such a manner that in each case one of the separating elements 28 can be opened or closed via the control unit 4. Additionally or alternatively, the separating elements 28 can be opened or closed by the field devices 8, 10, 12 by activation.

According to the present exemplary embodiment, the control unit 4 has a memory 24 in which a configuration record KD can be stored in each case for each of the field devices 8, 10, 12 by means of which the respective field device 8, 10, 12 can be configured in the field bus 38.

In the scenario shown in FIG. 1, the field devices 8 are operable field devices 8 whilst the field device 10 is to be exchanged. The reason for this can be that the field device 10 to be exchanged is defective, that the field device 10 to be exchanged is to be calibrated or that the field device 10 to be exchanged exhibits an increased risk of failure. The field device 10 to be exchanged is to be replaced by another field device 12 to be inserted.

For this reason, an exchange signal generator 14 is brought close to the field device 10 to be exchanged. The exchange signal generator 14 is designed to generate an exchange signal AS which can then be transmitted to the control unit 4 as will still be explained later.

Figure 2:
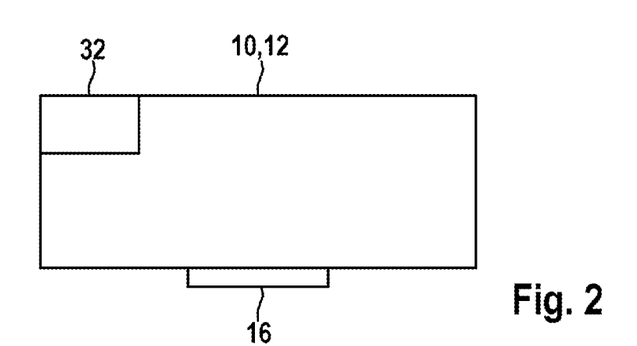
FIG. 2 shows a field device according to a first exemplary embodiment in a diagrammatic representation.

FIG. 2 shows diagrammatically a first exemplary embodiment of the field device 10, 12 to be exchanged or to be inserted, respectively. According to the first exemplary embodiment, the field device 10, 12 to be exchanged or to be inserted, respectively, has an exchange feature 16 by means of which an identification of the field device 10, 12 to be exchanged or to be inserted, respectively, is possible. According to one embodiment, the exchange feature 16 comprises an RFID label so that data can be transmitted wirelessly from the exchange feature 16 to the exchange signal generator 14 whereupon the exchange signal AS is then generated. Furthermore, the field device 10, 12 to be exchanged or to be inserted, respectively, can have a memory 32 in which the configuration record KD of the field device 10, 12 to be exchanged or to be inserted, respectively, can be stored.

Figure 3:
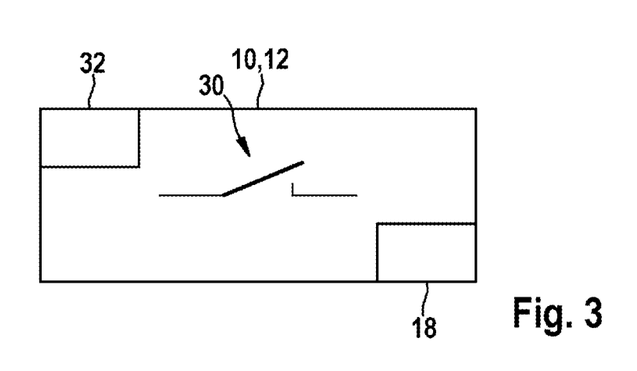
FIG. 3 shows a field device according to a second exemplary embodiment in a diagrammatic representation.

FIG. 3 diagrammatically shows a second exemplary embodiment of the field device 10, 12 to be exchanged or to be inserted, respectively. The field device 10, 12 to be exchanged or to be inserted, respectively, has a sensor element 30, the operation of which generates the exchange signal AS. According to one embodiment, the sensor element 30 comprises a magnetic switch so that a contactless operation of the sensor element 30 by bringing the exchange signal generator 14 close to the field device 10 to be exchanged is possible. Furthermore, the field device 10, 12 to be exchanged or to be inserted, respectively, can also have the memory 32 in which the configuration record KD of the field device 10, 12 to be exchanged or to be inserted, respectively, can be stored.

Figure 4:
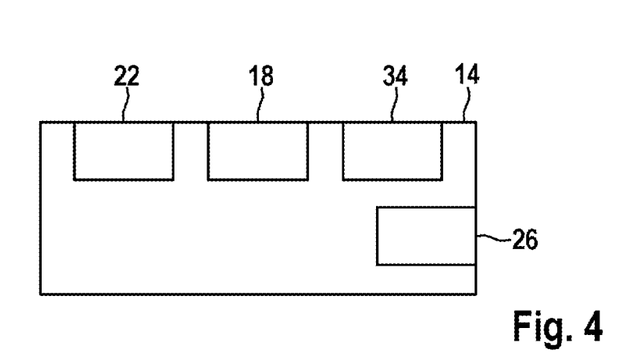
FIG. 4 shows an exchange signal generator in a diagrammatic representation.

FIG. 4 diagrammatically shows the exchange signal generator 14. The exchange signal generator 14 optionally has an interface 22. The interface 22 is constructed between the control unit 4 and the field device 10 to be exchanged compatibly with the data transmission link 6. The data transmission link 6 can be a field bus and the interface 22 can be designed for Near Field Communication (NFC) according to the technology standard ISO/IEC 14643 A, ISO/IEC 14643 B, ISO 18092, which enables two devices to transmit data and/or programs over a short distance (up to approx. 10 cm). The transmission can here be uni- or bidirectional. Thus, the field device 10, 12 to be exchanged or to be inserted, respectively, can communicate in accordance with the NFC standard and the field devices 10, 12 and the control unit 4 communicate via the field bus. Thus, data and/or signals can be fed into the data transmission link 6 and/or read out by the exchange signal generator 14 via the field device 10, 12 to be exchanged or to be inserted, respectively, the data and/or signals being transmitted via a communication link 36. In this context, e.g. the field device 10, 12 to be exchanged or to be inserted, respectively, can continue to process the data and/or signals, e.g. in that it translates the data and/or signals from the field device 10, 12 to be exchanged or to be inserted, respectively, and then forwards them to the control unit 4. Alternatively, the interface 22 and the data exchange link 6 are designed to be compatible with one another so that a translation of the data and/or signals by the field device 10, 12 to be exchanged or to be inserted, respectively, is not required. The protocol to be used can be, e.g. Bluetooth, NFC or WiFi. Furthermore, the interface 22 can be designed for wire-connected, wireless or optical waveguide-connected data transmission. Alternatively or additionally, the interface 22 can be designed to set up a communication channel 20 which forms a data-transmitting link between the exchange signal generator 14 and the control unit 4. Here, too, e.g. Bluetooth, NFC or WiFi can be used as protocol. Furthermore, the interface 22 can be designed here, too, for wire-connected, wireless or optical waveguide-connected data transmission.

Analogously to the field device 10, 12 shown in FIG. 2, with the exchange feature 16, the exchange signal generator 14 in FIG. 4 can have a readout unit 18. The readout unit 18 can be designed analogously as RFID readout unit. Furthermore, the exchange signal generator 14 in FIG. 4 can have a switch operating element 34 analogously to the field device 10, 12 shown in FIG. 3, with the sensor element 30. The switch operating element 34 can be designed as permanent magnet analogously to the magnetic switch. The exchange signal generator 14 in FIG. 4 also has optionally a memory 26 in which the configuration record KD of the field device 10, 12 to be exchanged or to be inserted, respectively, can be temporarily stored.

Figure 5:
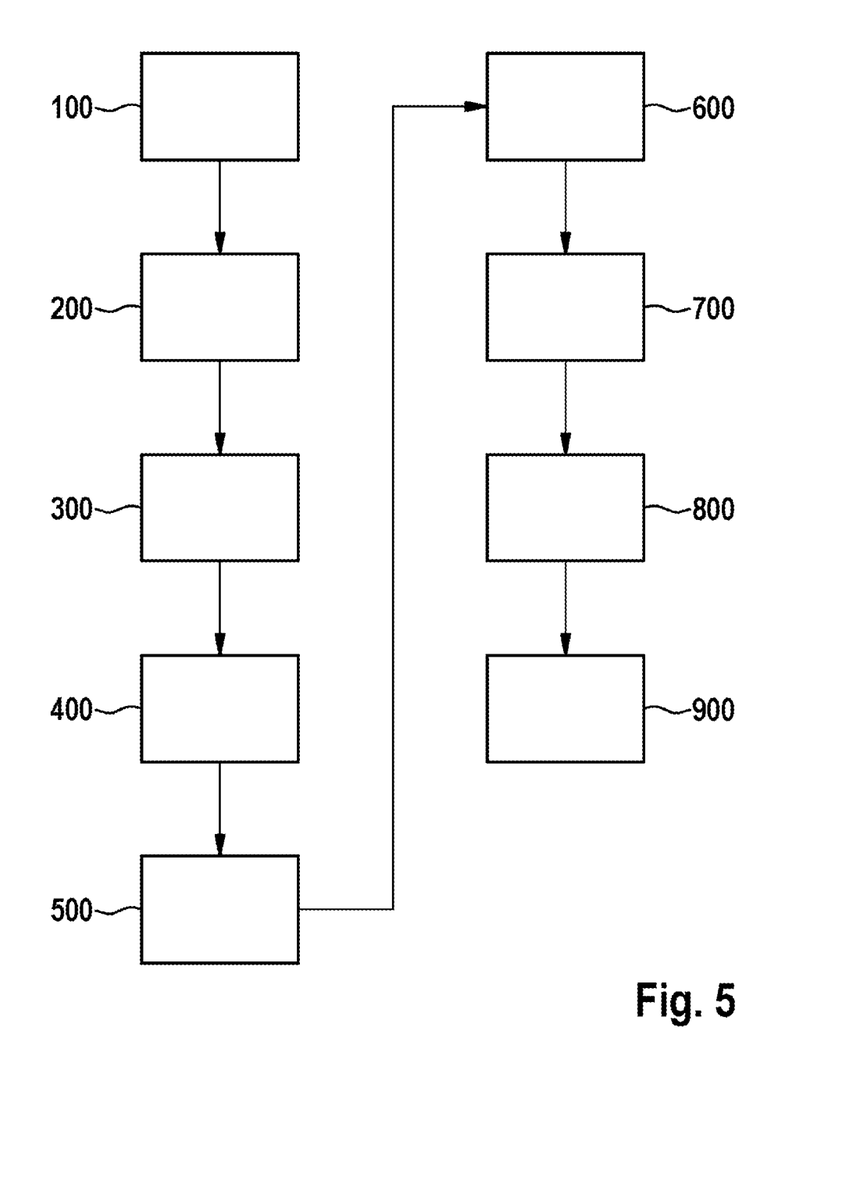
FIG. 5 shows a method sequence in diagrammatic representation.

The exchange of the defective field device 10 by an operable field device 12 will now be explained by means of FIG. 5, together with FIGS. 1 to 4.

In a first step 100, the impending exchange of the defective field device 100 is detected and the defective field device 10 is identified.

For this purpose, e.g., a technician holds the exchange signal generator 14 against the field device 10 which is defective and to be exchanged, therefore. By this means, the exchange signal AS is generated by the sensor element 30. Optionally, the field device 10 to be exchanged can thereupon actuate the generation of the exchange signal AS, e.g. by means of an optical signal, e.g. generated by means of an LED (not shown) of the field device 10 to be exchanged.

The first step 100 can comprise three substeps:
1. identification of the field device 10 to be exchanged,
2. transfer of an identification record ID for device identification to the control unit 4, and
3. generation of a feedback signal FS by the control unit 4.

According to a first exemplary embodiment, the first substep can comprise that the exchange signal generator 14 reads out the exchange feature 16 of the field device 10 to be exchanged. E.g., the field device 10 to be exchanged can be provided with an RFID label and the exchange signal generator 14 has an RFID readout unit.

According to a second exemplary embodiment, the first substep can comprise that the field device 10 to be exchanged has the sensor element 30 by means of which the exchange signal AS is detected by the field device 10 to be exchanged. E.g., the exchange signal AS can be a magnetic field, an electrical field, an electromagnetic field, a signal based on an interruption of a light barrier or a force producing a pressure signal.

According to a third exemplary embodiment, the first substep can comprise that the exchange signal AS is transmitted from the exchange signal generator 14 to the field device 10 to be exchanged. E.g., a communication link 36 which can be designed bidirectionally can be used for this purpose.

Once the field device 10 to be exchanged is identified, the identification record ID is thereupon transmitted to the control unit 4 for identification of the field device 10 to be exchanged.

According to a first exemplary embodiment, the second substep can comprise that, following reception of the exchange signal AS, the field device 10 to be exchanged transmits the identification record ID of the field device 10 to be exchanged to the control unit 4. For this purpose, e.g., the data exchange link 6 can be used. Thus, the field device 10 to be exchanged informs the control unit 4 that an exchange is impending. This exemplary embodiment is particularly efficient when the first substep has been performed in accordance with the second or third exemplary embodiment.

According to a second exemplary embodiment, the second substep can comprise that the control unit 4 checks at intervals whether an exchange signal AS is present and, following the presence of the exchange signal AS, the identification record ID of the field device 10 to be exchanged is transmitted to the control unit 4. For this purpose, e.g. the data exchange link 6 can be used.

According to a third exemplary embodiment, the second substep can comprise that an identification record ID of the field device 10 to be exchanged is transmitted to the control unit 4 by means of the communication channel 20. Thus, the data exchange link 6 is not loaded with the transmission of the identification record ID.

According to a fourth exemplary embodiment, the second substep can comprise that the identification record ID of the field device 10 to be exchanged is transmitted to the field device 10 to be exchanged via the interface 22 and the communication link 36. Subsequently, the identification record ID is transmitted to the control unit 4 via the data exchange link 6.

Once the identification record ID is present, the control unit can then optionally generate the feedback signal FS.

According to a first exemplary embodiment, the third substep can comprise that the control unit 4 transmits the feedback signal FS to the field device 10 to be exchanged. Following reception of the feedback signal FS, the field device 10 to be exchanged informs, e.g. by an optical display and/or acoustic message, that the feedback signal FS is present.

According to a second exemplary embodiment, the third substep can comprise that the control unit 4 transmits the feedback signal FS to the exchange signal generator 14 via the communication channel 20. The data exchange link 6 is thus not loaded with the transmission of the feedback signal FS.

According to a third exemplary embodiment, the third substep can comprise that the field device 10 to be exchanged transmits the feedback signal FS to the exchange signal generator 14. E.g., the feedback signal FS may not be perceptible to a technician and is reproduced by the exchange signal generator 14. For this purpose, the exchange signal generator 14 amplifies the feedback signal FS or converts it, e.g. ultrasound into sound.

According to a fourth exemplary embodiment, the third substep can comprise that the feedback signal FS is transmitted to the field device 10 to be exchanged via the interface 22 and the communication link 36.

In the case of the third and/or fourth exemplary embodiment, it can be provided that data and/or signals such as, e.g., IP messages, are forwarded to the field device 10 to be exchanged.

In a further, optional step 200, the configuration of the field device 10 to be exchanged is secured. For this purpose, the configuration record KD is read out of the memory 32 of the field device 10 to be exchanged and temporarily stored in memory 24 of the control unit 4 or in memory 26 of the exchange signal generator 14. Step 200 thus comprises two part-steps, namely the reading-out and the transmitting and temporarily storing of the configuration record KD. Transmitting and temporarily storing the configuration record KD can comprise that the configuration record KD is transmitted to the control unit 4 from the field device 10 to be exchanged via the data exchange link 6 or that the exchange signal generator 14 reads out the configuration record KD and transmits it via the communication channel 20 to the control unit 4. Alternatively, the configuration record KD can also be temporarily stored in the control unit 4 of the exchange signal generator 14 so that transmission to the control unit 4 can be omitted. Furthermore, the configuration record KD can be read out by the exchange signal generator 14 only after separating the field device 10 to be exchanged from the processing device 2.

In a further step 300, the control unit 4 effects steps for being able to remove the field device 10 to be exchanged securely and with minimum effects for the processing device 2. For this purpose, the data exchange link 6 is split open by at least one separating element 28. In the case of annular cabling, the separating elements 28 are selected in such a manner that only the smallest group of field devices 8 are separated from the data exchange link 6. If the data exchange link 6 is designed additionally for supplying field devices 8 with electrical energy, the power supply is also interrupted. In the case of an in-line cabling, only the field devices 8 behind the field device 10 to be exchanged are separated from the data exchange link 6 due to an activated separating element 28 in the direction of data transmission. Furthermore, it can be provided that the control unit 4 generates a message and sends it to the field devices, e.g. via a bus, that they will be temporarily deactivated by being switched off.

In a further step 400, the technician is informed that all preparations for the removal of the field device 10 to be exchanged are met. For this purpose, a preparation termination signal VS is generated. In this context, it is possible to proceed analogously to the third substep of the first step 100 if the field device 10 to be exchanged is not deactivated by switching-off.

Thus, the control unit 4 can transmit the preparation termination signal VS to the field device 10 to be exchanged, e.g. via the data exchange link 6. Following reception of the preparation termination signal VS, the field device 10 informs the technician, e.g. by an optical display and/or acoustic message, that the preparation termination signal VS is present.

Furthermore, the control unit 4 can transmit the preparation termination signal VS to the exchange signal generator 14 via the communication channel 20. Thus, the data exchange link 6 is not loaded with the transmission of the preparation termination signal VS.

Furthermore, the field device 10 to be exchanged can transmit the preparation termination signal VS to the exchange signal generator 14. E.g., the preparation termination signal VS may not be perceptible to a technician and is reproduced by the exchange signal generator 14. For this purpose, the exchange signal generator 14 amplifies the preparation termination signal VS or converts it, e.g. ultrasound into sound. Furthermore, it can be provided that the field device 10, 12 to be exchanged or to be inserted, respectively, processes the preparation termination signal VS further, e.g. in that 10 translates the preparation termination signal VS from the field device 10, 12 to be exchanged or to be inserted, respectively, and then forwards it to the control unit 4.

Finally, the preparation termination signal VS can be transmitted to the field device 10 to be exchanged via the interface 22 and the communication link 36.

If, in contrast, the field device 10 to be exchanged is without power, the control unit 4 can exchange data and/or signals with the exchange signal generator 14 via the communication channel 20. Alternatively, the field device 10 to be exchanged can provide feedback by a signal extinguished in the case of a lack of power.

This feedback can be transmitted, e.g., by the field device 10 to be exchanged to the exchange signal generator 14. E.g., the signal may not be perceptible to a technician and is reproduced by the exchange signal generator 14. For this purpose, the exchange signal generator 14 amplifies the signal or converts it, e.g. ultrasound into sound. Furthermore, it can be provided that the field device 10, 12 to be exchanged or to be inserted, respectively, processes the signal further, e.g. in that 10 translates the signal from the field device 10, 12 to be exchanged or to be inserted, respectively, and then forwards it to the control unit 4.

In a further step 500, the field device 10 to be exchanged is exchanged by the field device 12 to be inserted.

In a further step 600, the completed exchange of the field devices 10, 12 is detected. For this purpose, a message MT is generated, e.g. by the field device 12 inserted.

According to a first exemplary embodiment, the message MT can be transmitted from the field device 12 inserted to the control unit 4 by means of the communication channel 20. Thus, the data exchange link 6 is not loaded with the transmission of the message MT. Optionally, the message MT can have data for the identification of the new field device 12.

According to a second exemplary embodiment, the control unit 4 can attempt at intervals to address the new field device 12, to supply the inserted field device 12 with electrical energy and detect the power consumption of the new field device 12 or evaluate communication characteristics of the data exchange link 6 with respect to whether the field device 12 inserted has been connected, e.g. because a circuit of an annular cabling is closing or the transmission quality of the data exchange link 6 is being impaired due to the field device 12 inserted.

According to a third exemplary embodiment, the field device 12 inserted can transmit the message MT to the control unit 4 when the field device 12 inserted has been connected to the processing device 2. The prerequisite for this is that the field device 12 inserted is supplied with electrical energy.

According to a fourth exemplary embodiment, the field device 12 inserted transmits the message MT to the exchange signal generator 14. The exchange signal generator 14 then transmits the message MT to the control unit 4 via the communication channel 20. This makes sense when the field device 12 inserted can be supplied with electrical energy but this is not sufficient for exchanging data and/or signals with the control unit 4 without reaction since the electrical energy is insufficient for a simultaneous data exchange with a number of field devices 8.

In a further step 700 the field device 12 inserted, and all other deactivated field devices 8 are again placed into a communicating state. For this purpose, following the message MT, the data exchange link 6 split open is connected again in the data-transmitting manner. For this purpose, the separating elements 28 opened previously in step 300 are closed again by drive signals from the control unit 4.

In a further step 800, the configuration is restored. For this purpose, the configuration record KD is read out of the memory 26 of the exchange signal generator 14 or out of the memory 24 of the control unit 4 and stored in memory 32 of the field device 12 inserted. For the transmission of the configuration record KD, the data exchange link 6 and the interface 22 with the communication link 36 or the communication channel 20 can be used.

In a further step 900, the completed termination of the exchange is indicated. For this purpose, the control unit 4 transmits a termination signal AB to the field device 12 inserted, e.g. by means of data exchange link 6. Following the reception of the termination signal AB, the field device 12 inserted informs, e.g. by an optical display and/or acoustic message, that the termination signal AB is present. Furthermore, the control unit 4 can transmit the termination signal AB to the exchange signal generator 14 via the communication channel 20. Thus, the data exchange link 6 is not loaded with the transmission of the termination signal AB. Furthermore, the field device 12 inserted can transmit the termination signal AB to the exchange signal generator 14. E.g., the termination signal AB may not be perceptible to a technician and is reproduced by the exchange signal generator 14. For this purpose, the exchange signal generator 14 amplifies the termination signal AB or converts it, e.g. ultrasound into sound. Finally, the termination signal AB can be transmitted to the inserted field device 12 via the interface 22 with the communication link 36.

Thus, it is indicated that the defective field device 10 has been exchanged for a new, operable field device 12 and the processing device 2 is again operable to its full extent.

The invention claimed is:

1. A method for operating a processing device with a control unit and at least one field device connected to the control unit for data exchange by means of a data exchange link, in which a first field device to be exchanged is replaced by a second field device to be inserted, the method comprising:
   detecting an impeding exchange of the first field device with the second field device by detecting an exchange feature of the first field device to be exchanged,
   generating, in response to detecting the exchange feature, an exchange signal by means of an exchange signal generator, the exchange signal indicative of the impending exchange of the first field device,
   transmitting the exchange signal to the control unit,
   receiving, at the control unit and after receiving the exchange signal, a configuration record of the first field device from the exchange signal generator or the first field device,
   opening the data exchange link between the control unit and the first field device,
   detecting that the first field device has been exchanged with the second field device,
   reconnecting the data exchange link such that the data exchange link is between the control unit and the second field device, and
   configuring the second field device based on the configuration record of the first field device.

2. The method as claimed in claim 1, in which the first field device to be exchanged has a sensor by means of which the exchange signal is detected.

3. The method as claimed in claim 1, in which the exchange signal is transmitted from the exchange signal generator to the first field device and transmitted to the control unit from the first field device.

4. The method as claimed in claim 1, in which, following the presence of the exchange signal, an identification record of the first field device is transmitted to the control unit.

5. The method as claimed in claim 1, in which, following the presence of the exchange signal, a feedback signal is generated.

6. The method as claimed in claim 1, in which the configuration record is read out of a memory of the first field device and is temporarily stored in a memory of the control unit or in a memory of the exchange signal generator.

7. The method as claimed in claim 1, in which a preparation termination signal is generated when the processing device is prepared for replacing the first field device with the second field device.

8. The method as claimed in claim 1, in which an exchange of the field device to be exchanged is detected by the second field device and, thereupon, a message is generated and, following the message, the data exchange link is reconnected in a data-transmitting manner.

9. A computer program with program code means which cause a computing unit, to perform a method as claimed in claim 1 when they are executed on the computing unit.

10. A machine-readable storage medium with a computer program as claimed in claim 9, stored thereon.

11. The method of claim 1, wherein the exchange feature of the first field device to be exchanged is detected via the exchange signal generator by bringing the exchange signal generator close to the first field device to be exchanged.

12. A processing device with a control unit and a first field device connected to the control unit for data exchange by means of a data exchange link, the first field device, in interaction with an exchange signal generator configured to generate an exchange signal in response to detecting an impeding exchange of the first field device with the second field device by detecting an exchange feature of the first field device and transmit the exchange signal to the control unit, wherein the control unit is configured to receive, from the exchange signal generator, the exchange signal, the exchange signal indicative of the impending exchange of the first field device, receive, at the control unit and after receiving the exchange signal, a configuration record of the first field device from the first field device or the exchange signal generator, open the data exchange link between the control unit and the first field device, detect that the first field device has been exchanged with a second field device, reconnect the data exchange link such that the data exchange link is between the control unit and the second field device, and configure the second field device based on the configuration record of the first field device.

13. The processing device of claim 12, wherein the exchange signal generator detects the exchange feature of the first field device when the exchange signal generator is brought close to the first field device to be exchanged.

14. A system comprising:

a first field device configured to generate an exchange signal by means of an exchange signal generator, and a processing device having a control unit, the control unit configured to receive, from the exchange signal generator, the exchange signal, the exchange signal indicative of an impending exchange of the first field device with the second field device, receive, at the control unit and after receiving the exchange signal, a configuration record of the first field device from the first field device or the exchange signal generator, open the data exchange link between the control unit and the first field device, detect that the first field device has been exchanged with a second field device, reconnect the data exchange link such that the data exchange link is between the control unit and the second field device, and configure the second field device based on the configuration record of the first field device.

15. The system of claim 14, wherein the first field device generates the exchange signal when the exchange signal generator is brought close to the first field device.

* * * * *